US009799168B2

(12) United States Patent
Baerlocher et al.

(10) Patent No.: US 9,799,168 B2
(45) **Date of Patent: *Oct. 24, 2017**

(54) GAMING DEVICE HAVING A RE-TRIGGERING SYMBOL BONUS SCHEME

(71) Applicant: IGT, Las Vegas, NV (US)

(72) Inventors: Anthony J. Baerlocher, Henderson, NV (US); Ryan W. Cuddy, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/265,479

(22) Filed: Sep. 14, 2016

(65) Prior Publication Data

US 2017/0004682 A1 Jan. 5, 2017

Related U.S. Application Data

(63) Continuation of application No. 14/286,198, filed on May 23, 2014, now Pat. No. 9,449,471, which is a (Continued)

(51) Int. Cl.

| | |
|---|---|
| ***G06F 19/00*** | (2011.01) |
| ***G07F 17/32*** | (2006.01) |
| ***G07F 17/34*** | (2006.01) |

(52) U.S. Cl.

CPC ...... *G07F 17/3267* (2013.01); *G07F 17/3209* (2013.01); *G07F 17/3213* (2013.01); (Continued)

(58) Field of Classification Search

None

See application file for complete search history.

(56) References Cited

U.S. PATENT DOCUMENTS 3,913,532 A * 10/1975 Frentzel .................... F01C 1/20 123/232

4,198,052 A 4/1980 Gauselmann (Continued)

FOREIGN PATENT DOCUMENTS

| | | |
|---|---|---|
| AU | 771847 | 3/2001 |
| EP | 0 874 337 | 10/1998 |

(Continued)

OTHER PUBLICATIONS

Addams Family Article written by IGT, published in 2000 (3 pages).

(Continued)

*Primary Examiner* — Paul A D'Agostino

(74) *Attorney, Agent, or Firm* — Neal, Gerber & Eisenberg LLP

(57) ABSTRACT

A gaming device having a bonus scheme wherein a combination of bonus symbols trigger a bonus game and any one of the bonus symbols in the bonus game provides a player with an award. The award may be an extension of the bonus game by providing the player with additional spins or games. Also, the award may modify the combination and type of bonus symbols needed to enter the bonus game. Furthermore, the award may modify the award values in the bonus game. Therefore, a combination of bonus symbols triggers the bonus game and also triggers the gaming device to provide bonus awards in the bonus game. The re-triggering symbol award bonus scheme changes the probability of winning for the player and therefore creates a higher level of excitement and enjoyment of the game.

20 Claims, 6 Drawing Sheets

Related U.S. Application Data continuation of application No. 13/555,583, filed on Jul. 23, 2012, now Pat. No. 8,753,190, which is a continuation of application No. 13/015,037, filed on Jan. 27, 2011, now Pat. No. 8,246,444, which is a continuation of application No. 12/031,629, filed on Feb. 14, 2008, now Pat. No. 7,927,206, which is a continuation of application No. 11/156,112, filed on Jun. 17, 2005, now Pat. No. 7,331,867, which is a continuation of application No. 09/981,133, filed on Oct. 15, 2001, now Pat. No. 6,913,532.

(52) U.S. Cl.
CPC ...... *G07F 17/3225* (2013.01); *G07F 17/3244* (2013.01); *G07F 17/3246* (2013.01); *G07F 17/3251* (2013.01); *G07F 17/34* (2013.01)

(56) References Cited

U.S. PATENT DOCUMENTS 4,624,459 A 11/1986 Kaufman
4,695,053 A 9/1987 Vazquez, Jr. et al.
5,085,436 A 2/1992 Bennett
5,205,555 A 4/1993 Hamano
5,393,057 A * 2/1995 Marnell, II ............. G07F 17/32 273/269
5,407,200 A * 4/1995 Zalabak .................. A63F 3/069 273/139
5,423,539 A 6/1995 Nagao
5,449,173 A 9/1995 Thomas et al.
5,456,465 A 10/1995 Durham
5,560,603 A 10/1996 Seelig et al.
5,647,798 A 7/1997 Falciglia
5,722,891 A 3/1998 Inoue
5,772,506 A * 6/1998 Marks ................. G07F 17/3293 463/13
5,775,692 A * 7/1998 Watts .................. G07F 17/3267 273/143 R
5,788,573 A 8/1998 Baerlocher et al.
5,823,874 A 10/1998 Adams
5,855,514 A * 1/1999 Kamille .................. A63F 3/065 273/138.1
5,918,880 A * 7/1999 Voigt, IV .............. A63F 3/0023 273/143 R
5,935,002 A * 8/1999 Falciglia ................. G07F 17/32 273/143 R
5,947,820 A 9/1999 Morro et al.
5,964,463 A * 10/1999 Moore, Jr. .......... A63F 3/00157 273/274
5,971,849 A * 10/1999 Falciglia ............. G07F 17/3293 273/292
5,980,384 A 11/1999 Barrie
5,988,638 A * 11/1999 Rodesch ................. G07F 17/32 273/143 R
6,003,867 A * 12/1999 Rodesch ................. G07F 17/32 273/143 R
6,004,207 A 12/1999 Wilson, Jr. et al.
6,012,982 A * 1/2000 Piechowiak ............ G07F 17/32 463/16
6,015,346 A 1/2000 Bennett
6,050,895 A * 4/2000 Luciano, Jr. ........ G07F 17/3295 463/20
6,056,642 A 5/2000 Bennett
6,059,289 A 5/2000 Vancura
6,089,976 A 7/2000 Schneider et al.
6,102,400 A * 8/2000 Scott ................... A63F 3/00157 273/138.1
6,126,542 A 10/2000 Fier
6,135,884 A 10/2000 Hedrick et al.
6,155,925 A 12/2000 Giobbi et al.
6,159,095 A 12/2000 Frohm et al.
6,159,097 A 12/2000 Gura
6,159,098 A 12/2000 Slomiany et al.
6,168,523 B1 1/2001 Piechowiak et al.
6,173,855 B1 * 1/2001 Stark .................. B60K 15/0406 220/203.12
6,173,955 B1 1/2001 Perrie et al.
6,174,233 B1 * 1/2001 Sunaga ................... G07F 17/32 463/20
6,174,235 B1 1/2001 Walker et al.
6,190,254 B1 * 2/2001 Bennett ................... G07F 17/34 273/143 R
6,190,255 B1 2/2001 Thomas et al.
6,203,429 B1 3/2001 Demar et al.
6,220,959 B1 * 4/2001 Holmes, Jr. ............... A63F 1/00 273/292
6,224,483 B1 5/2001 Mayeroff
6,227,971 B1 * 5/2001 Weiss .................. G07F 17/3244 273/143 R
6,231,442 B1 5/2001 Mayeroff
6,231,445 B1 5/2001 Acres
6,234,897 B1 5/2001 Frohm et al.
6,238,287 B1 5/2001 Komori et al.
6,270,409 B1 * 8/2001 Shuster ............... G07F 17/3244 273/143 R
6,270,411 B1 * 8/2001 Gura ................... G07F 17/3244 273/138.2
6,305,686 B1 * 10/2001 Perrie ...................... G07F 17/34 273/142 R
6,311,976 B1 11/2001 Yoseloff et al.
6,312,334 B1 11/2001 Yoseloff
6,315,660 B1 * 11/2001 DeMar ................ G07F 17/3267 273/138.2
6,315,663 B1 * 11/2001 Sakamoto ........... G07F 17/3265 273/143 R
6,328,649 B1 12/2001 Randall et al.
6,340,158 B2 * 1/2002 Pierce ..................... A63F 7/022 273/121 B
6,346,043 B1 2/2002 Colin et al.
6,347,996 B1 2/2002 Gilmore et al.
6,358,147 B1 3/2002 Jaffe et al.
6,364,766 B1 4/2002 Anderson et al.
6,364,768 B1 4/2002 Acres et al.
6,368,216 B1 4/2002 Hedrick et al.
6,375,567 B1 4/2002 Acres
6,394,902 B1 * 5/2002 Glavich .............. G07F 17/3244 273/143 R
6,398,218 B1 6/2002 Vancura
6,398,644 B1 * 6/2002 Perrie ................. A63F 3/00075 273/138.1
6,439,993 B1 8/2002 O'Halloran
6,443,452 B1 * 9/2002 Brune ..................... G07F 17/32 273/143 R
6,443,837 B1 9/2002 Jaffe et al.
6,471,208 B2 * 10/2002 Yoseloff .................. G07F 17/32 273/143 R
6,481,713 B2 * 11/2002 Perrie ..................... G07F 17/34 273/142 R
6,491,584 B2 12/2002 Graham et al.
6,533,658 B1 3/2003 Walker et al.
6,537,150 B1 * 3/2003 Luciano .............. G07F 17/3244 273/138.2
6,537,152 B2 * 3/2003 Seelig ................. A63F 3/00028 463/20
6,561,904 B2 * 5/2003 Locke ..................... G07F 17/32 463/20
6,565,436 B1 5/2003 Baerlocher
6,602,137 B2 * 8/2003 Kaminkow ............. G07F 17/32 273/138.1
6,604,740 B1 * 8/2003 Singer ................. G07F 17/3262 273/143 R
6,648,758 B2 11/2003 Bennett et al.
6,712,693 B1 3/2004 Hettinger
6,712,694 B1 3/2004 Nordman
6,733,389 B2 * 5/2004 Webb ...................... G07F 17/32 273/138.1
6,767,283 B1 7/2004 Weiss
6,805,349 B2 10/2004 Baerlocher et al.

(56) References Cited

U.S. PATENT DOCUMENTS

| | | | | |
|---|---|---|---|---|
| 6,869,360 | B2 * | 3/2005 | Marks | G07F 17/3244 463/20 |
| 6,913,532 | B2 | 7/2005 | Baerlocher et al. | |
| 6,921,335 | B2 * | 7/2005 | Rodgers | G07F 17/34 273/138.1 |
| 6,939,226 | B1 | 9/2005 | Joshi | |
| 6,955,600 | B2 | 10/2005 | Glavich et al. | |
| 7,066,814 | B2 | 6/2006 | Glavich et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,121,942 | B2 | 10/2006 | Baerlocher | |
| 7,169,042 | B2 | 1/2007 | Muir et al. | |
| 7,198,570 | B2 | 4/2007 | Rodgers et al. | |
| 7,235,011 | B2 | 6/2007 | Randall et al. | |
| 7,238,110 | B2 | 7/2007 | Glavich et al. | |
| 7,258,611 | B2 | 8/2007 | Bigelow et al. | |
| 7,300,351 | B2 | 11/2007 | Thomas | |
| 7,331,867 | B2 | 2/2008 | Baerlocher et al. | |
| 7,473,174 | B2 | 1/2009 | Cuddy et al. | |
| 7,699,696 | B2 | 4/2010 | Baerlocher et al. | |
| 7,775,872 | B2 | 8/2010 | Bleich et al. | |
| 7,789,747 | B2 | 9/2010 | Glavich et al. | |
| 8,075,388 | B1 | 12/2011 | Bennett | |
| 2001/0009865 | A1 * | 7/2001 | Demar | G07F 17/3267 463/20 |
| 2001/0036857 | A1 * | 11/2001 | Mothwurf | A63F 3/00157 463/25 |
| 2001/0048193 | A1 | 12/2001 | Yoseloff et al. | |
| 2002/0010017 | A1 | 1/2002 | Bennett | |
| 2002/0025848 | A1 | 2/2002 | Graham et al. | |
| 2003/0045343 | A1 | 3/2003 | Luccesi et al. | |
| 2004/0053666 | A1 | 3/2004 | Vancura | |

FOREIGN PATENT DOCUMENTS

| | | |
|---|---|---|
| EP | 0 981 119 | 2/2000 |
| EP | 1513117 | 3/2005 |
| GB | 2 322 217 | 8/1998 |
| WO | WO 00/32286 | 6/2000 |
| WO | WO 01/26019 | 4/2001 |

OTHER PUBLICATIONS

Big Business Advertisement, written by Video, published prior to Feb. 2008 (2 pages).

Catch a Wave Advertisement written by IGT, published in Dec. 2000 (2 pages).

Dolphin Treasure Advertisement written by Aristocrat Leisure Industries Pty. Ltd., published in 1996 (2 pages).

Ghoulish Gamble Advertisement written by Strictly Slots, published in Nov. 2000 (3 pages).

Money in the Bank, published in Strictly Slots, available Jun. 2001 (1 page).

Spin Til You Win Game Description written by IGT, published in 1996 (1 page).

Top Dollar Advertisement written by IGT, published in 1998 (2 pages).

Triple Bucks Advertisement written by IGT, published in 1999 (3 pages).

Wild Bear Salmon Run, written by IGT, published in 2003 (2 pages).

Winning Bid Advertisement written by WMS Gaming Inc., published prior to Jan. 2001 (2 pages).

Casino Journal, World of Slots '99, vol. 12, No. 9, Sep. 1999 (8 pages).

* cited by examiner

GAMING DEVICE HAVING A RE-TRIGGERING SYMBOL BONUS SCHEME

PRIORITY CLAIM

This application is a continuation of, and claims priority to and the benefit of, U.S. patent application Ser. No. 14/286,198, which was filed on May 23, 2014, which is a continuation of, and claims priority to and the benefit of, U.S. patent application Ser. No. 13/555,583, which was filed on Jul. 23, 2012, and issued as U.S. Pat. No. 8,753,190 on Jun. 17, 2014, which is a continuation of, and claims priority to and the benefit of, U.S. patent application Ser. No. 13/015,037, which was filed on Jan. 27, 2011, and issued as U.S. Pat. No. 8,246,444 on Aug. 21, 2012, which is a continuation of, and claims priority to and the benefit of, U.S. patent application Ser. No. 12/031,629, which was filed on Feb. 14, 2008, and issued as U.S. Pat. No. 7,927,206 on Apr. 19, 2011, which is a continuation of, and claims priority to and the benefit of, U.S. patent application Ser. No. 11/156,112, which was filed on Jun. 17, 2005, and issued as U.S. Pat. No. 7,331,867 on Feb. 19, 2008, which is a continuation of, and claims priority to and the benefit of, U.S. patent application Ser. No. 09/981,133, which was filed on Oct. 15, 2001, and issued as U.S. Pat. No. 6,913,532 on Jul. 5, 2005, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates in general to a gaming device, and more particularly to a gaming device having a re-triggering symbol bonus scheme.

The base or primary game of most slot machines involves one or more mechanical or video spinning reels, each of which display a plurality of symbols. In many such games, a triggering event such as a symbol or combination of symbols yield one or more opportunities or chances in a bonus or secondary game, which is played in addition to the base game.

It is desirable to provide players with new and different gaming devices with new and different bonus schemes for the enjoyment and entertainment of players.

SUMMARY

One embodiment of the present invention provides a gaming device having a slot base game and a slot bonus game wherein one or more bonus triggering symbols in the base game are employed as bonus re-triggers in the bonus game. In one preferred embodiment, the occurrence of a predetermined combination of a plurality of bonus triggering symbols (such as three bonus triggering symbols along a payline) in a base game triggers a corresponding bonus game. In that bonus game, the same bonus triggering symbols in any position (i.e., a scatter pay) functions as the bonus re-trigger in the bonus game which causes one or more additional activations of the reels or one or more re-triggers of that entire bonus game. The probability of obtaining the bonus re-trigger in the bonus game which is based on the same bonus symbols needed to trigger the bonus game in the base game is greater than the probability of obtaining the bonus trigger in the base game because the combination of bonus triggering symbols can occur anywhere on the reels in the bonus game to cause the bonus re-trigger (i.e., a scatter pay).

Accordingly, the present invention provides a gaming device, which includes a symbol or symbol combination in a primary or base game which triggers a secondary or bonus game, and a symbol or symbol combination in the secondary or bonus game which is more likely to occur in the bonus game and which re-triggers the secondary or bonus game or a portion thereof. More generally, the present invention provides a gaming device which includes a bonus triggering event in a primary or base game which triggers a secondary or bonus game and a bonus re-triggering event in the secondary or bonus game which re-triggers the secondary or bonus game or a portion thereof. The bonus triggering event in the primary or base game and the bonus re-triggering event in the secondary or bonus game preferably employ the same symbols or symbol combinations such that the bonus re-triggering event in the secondary or bonus game is more likely to occur in the bonus game than the bonus triggering event in the primary or base game.

The bonus re-trigger in the bonus game may, for instance, provide the player a bonus game extension such as additional or free spins in the bonus game, a replay of the entire bonus game, or a modification to the bonus game such as changing the bonus re-triggering symbol or bonus re-triggering combination of symbols in the bonus game. The bonus-retrigger can alternatively cause other changes in the bonus game as desired by the game implementor. For instance, the bonus re-trigger may cause a modification of the bonus award pay scale or table such as doubling or tripling subsequent award values in the bonus game.

It is therefore an advantage to provide a gaming device having a re-triggering symbol bonus scheme.

Other features and advantages will be apparent from the following detailed disclosure, taken in conjunction with the accompanying sheets of drawings, wherein like numerals refer to like parts, elements, components, steps and processes.

DETAILED DESCRIPTION

Gaming Device and Electronics

Figure 1A:
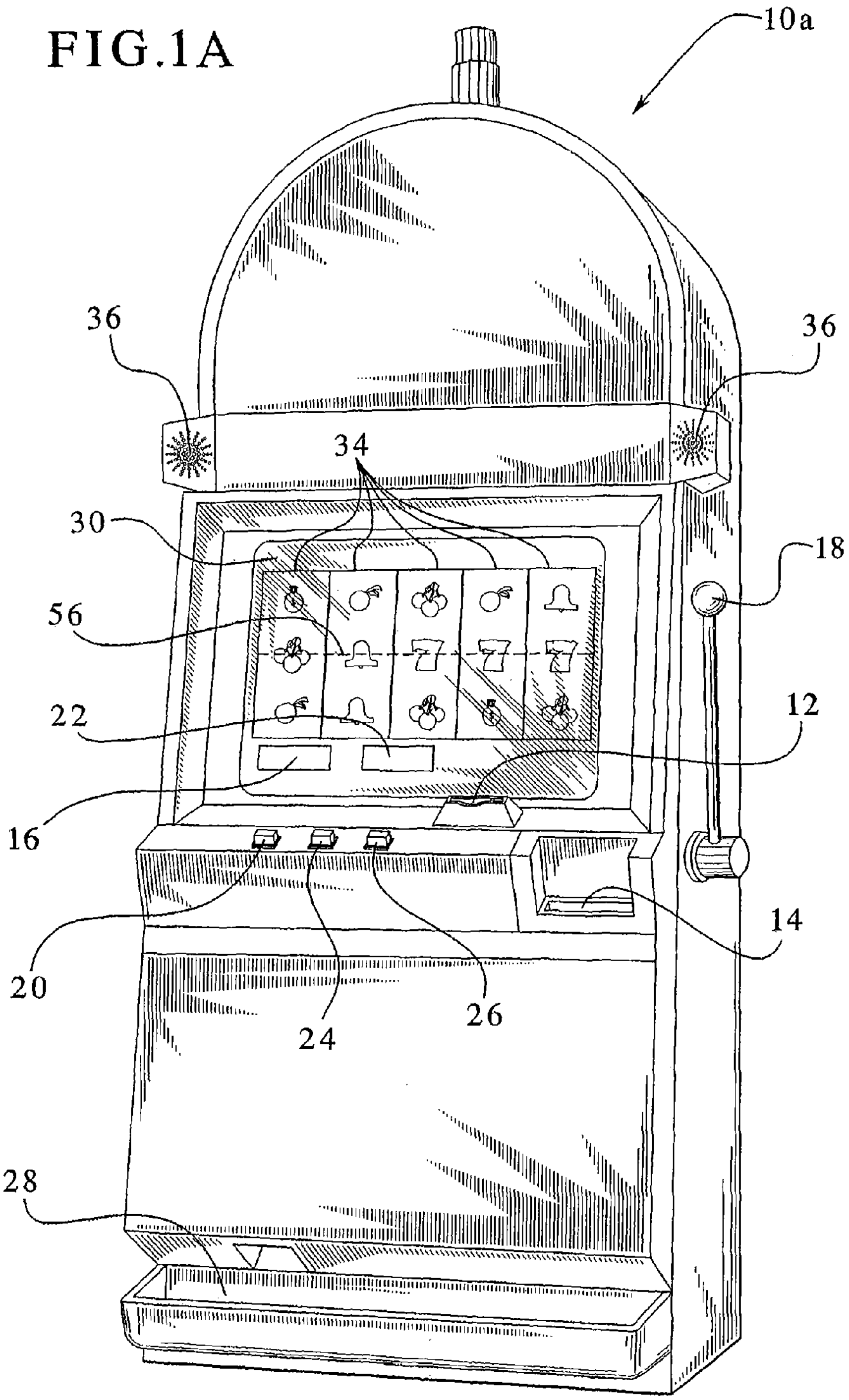
FIG. 1A is a front elevation view of a general embodiment of the gaming device of the present invention.
Figure 1B:
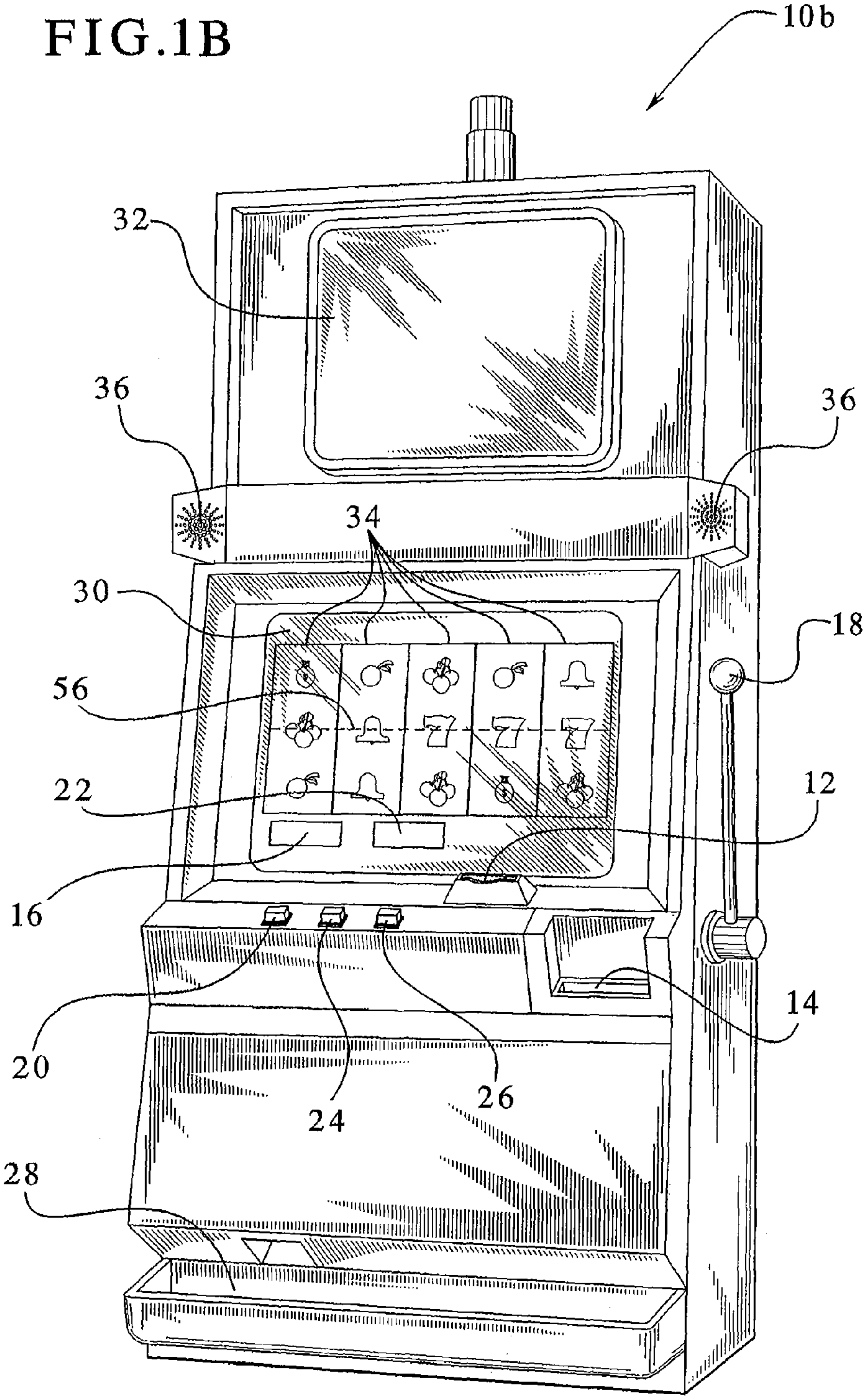
FIG. 1B is a front elevation view of a second embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and is preferably mounted in a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 may be adapted to incorporate any primary game such as slot, poker, blackjack or keno, any of their bonus triggering events and any of their bonus round games in conjunction with the present invention. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device may also include a conventional bet maximum button (not shown) and conventional payline bet buttons.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia or symbols such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
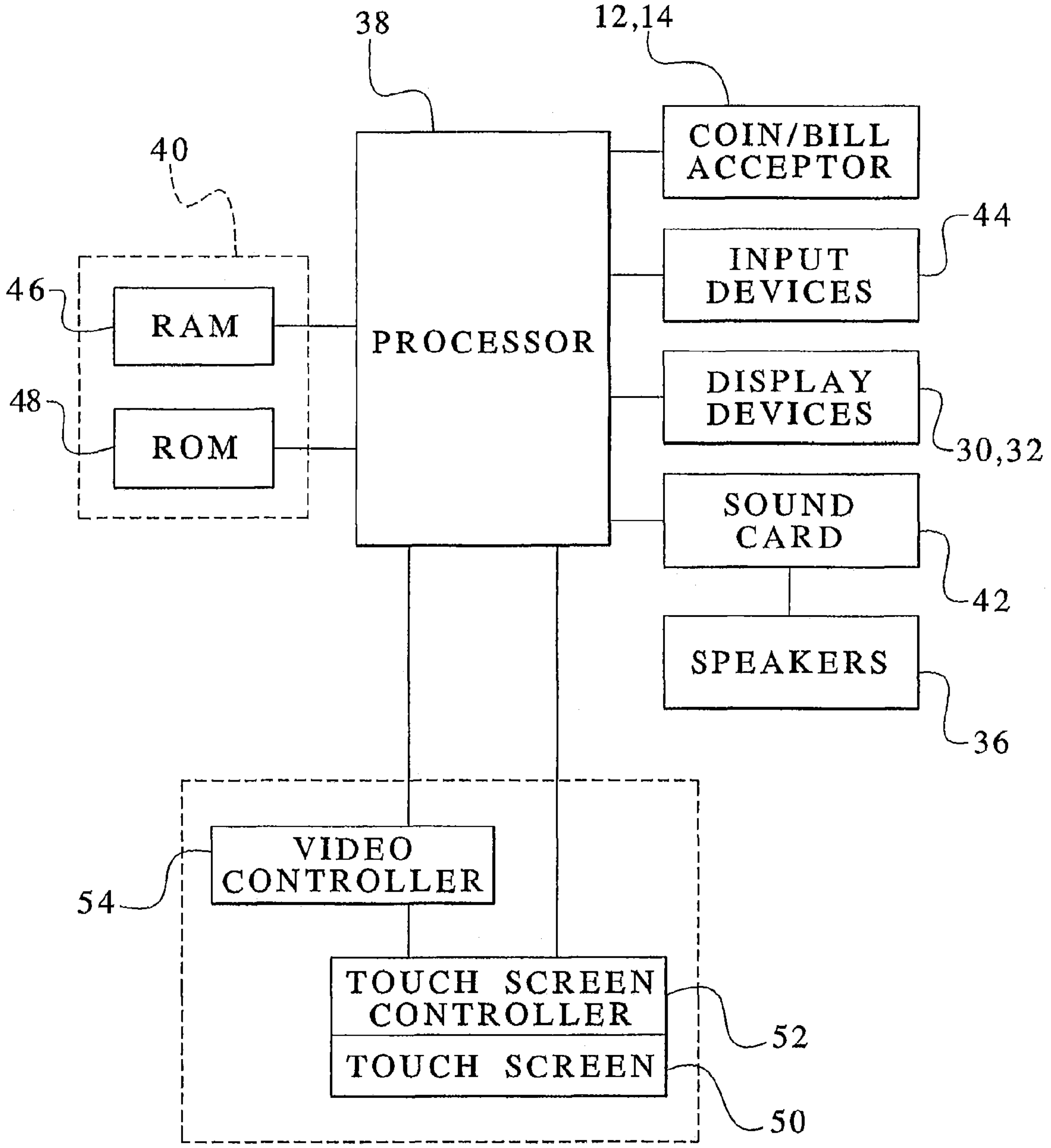
FIG. 2 is a schematic block diagram of the electronic configuration of one embodiment of the gaming device of the present invention.

As illustrated in FIG. 2, the general electronic combination of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The processor may include a main processor and a sub-processor which control certain features of the gaming device in conjunction with the main processor. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device as discussed in detail below. The gaming device 10 in one embodiment uses a video-based central display device 30 to enable the player to play the bonus round. In one embodiment as discussed below, the qualifying condition is a predetermined combination of indicia or symbols appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Re-Trigger

Figure 3A:
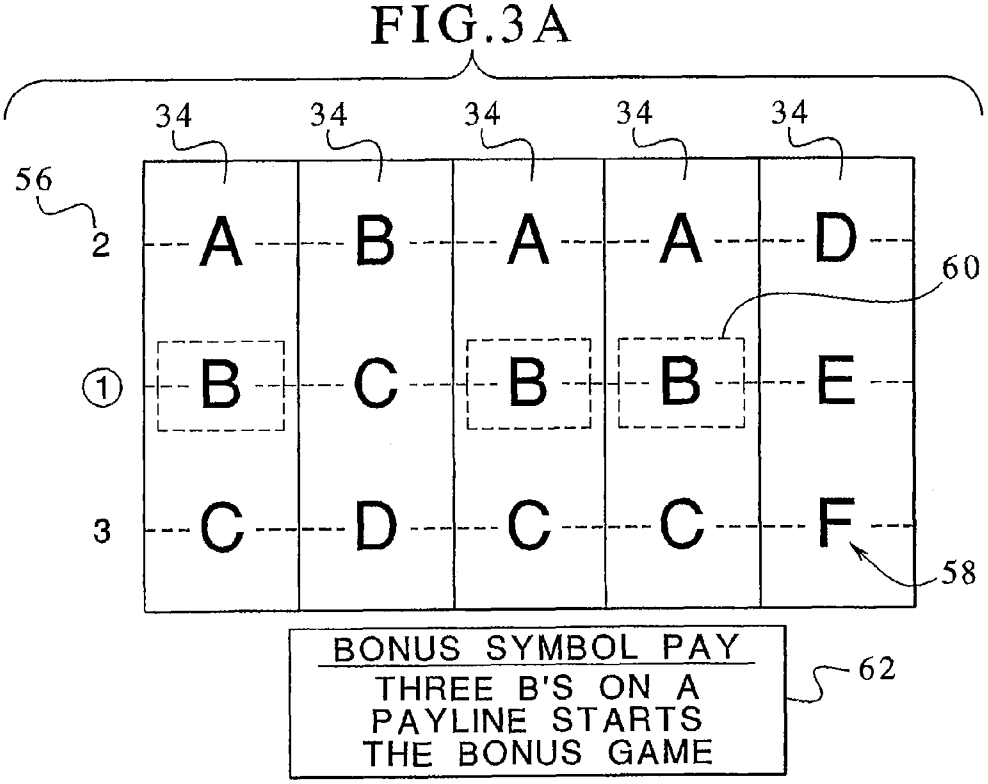
FIG. 3A is an enlarged front elevation view of one of the display devices of FIGS. 1A and 1B showing an embodiment of a bonus triggering symbol combination.

Referring now to FIG. 3A, a set of mechanical or video reels 34 is generally illustrated having symbols 58 designated as A through F. It should be appreciated that any suitable set of symbols could be used as the symbols 58 in accordance with the present invention. In this embodiment, the "B" symbols 60 are the bonus symbols and the appearance of three "B" symbols on any activated payline, such as payline 1, triggers a bonus game as indicated by bonus display 62. Although in this example three "B" symbols are used to trigger the bonus game, it should be appreciated that any symbol combination having the same symbol or designated symbols may be used as the bonus triggering combination.

Figure 3B:
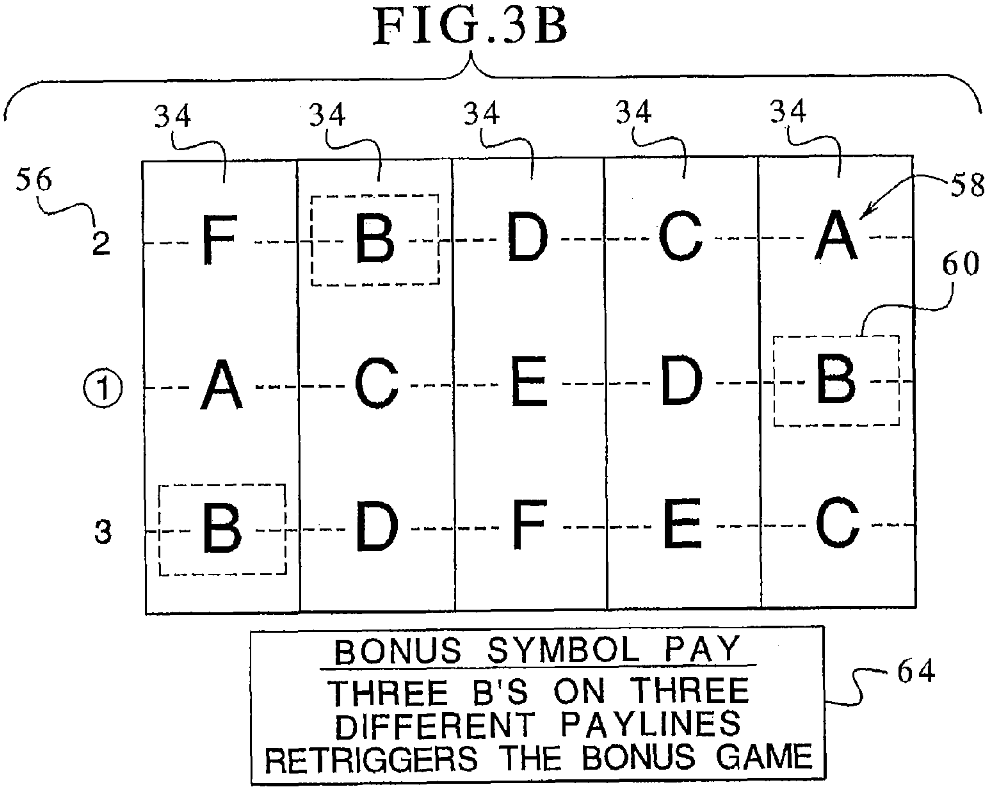
FIG. 3B is an enlarged front elevation view of one of the display devices of FIGS. 1A and 1B illustrating a bonus re-trigger symbol combination in a bonus game.

FIG. 3B illustrates one embodiment of the bonus game of the present invention in which the bonus re-trigger occurs in the bonus game when the same symbols which trigger the bonus game in the base game are displayed in a scattered combination on multiple paylines. In this embodiment, the "B" symbol 60 is the bonus re-trigger symbol and any three "B" symbols on three paylines provides the bonus re-trigger in the bonus game as described in bonus display 64. Accordingly, as described above, in accordance with the present invention, the bonus re-trigger will occur more frequently than the bonus trigger because the bonus trigger will only occur when the bonus triggering symbols are aligned along a payline. The bonus re-trigger, however, will occur when the bonus triggering symbols are aligned along a payline or when the bonus triggering symbols occur along any payline.

Figure 4:
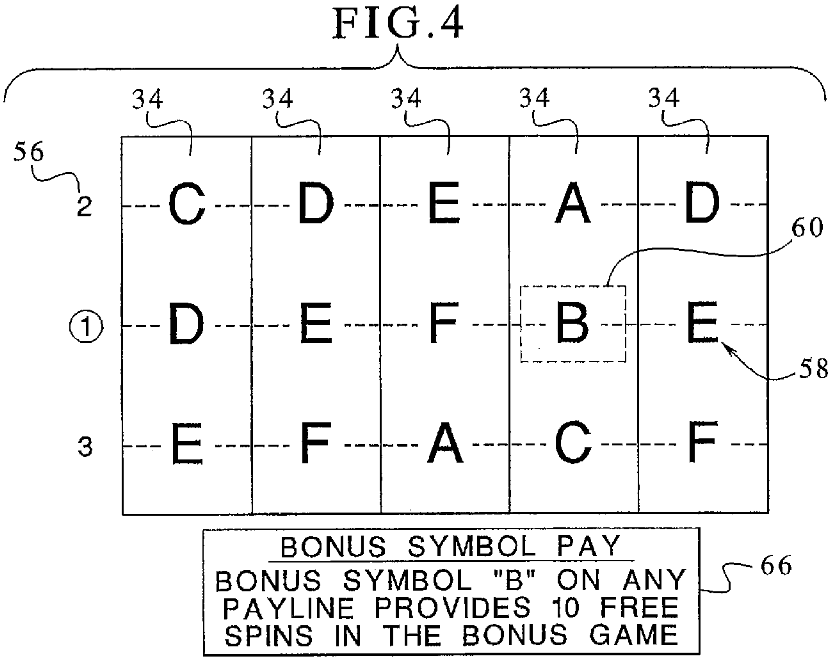
FIG. 4 is an enlarged front elevation view of one of the display devices of FIGS. 1A and 1B illustrating a bonus re-trigger in a bonus game where a player receives additional spins.

Referring now to FIG. 4, one embodiment of the present invention is shown in which the bonus re-trigger occurs when one bonus triggering symbol occurs. In this example, the bonus game was triggered by obtaining a predetermined combination of the bonus symbols "B" 60 as illustrated in FIG. 3A, for instance. The bonus triggering symbol "B" is the bonus re-trigger symbol in the bonus game. In other words, any one of the bonus symbols "B" which in combination trigger the bonus game in the base game, is the symbol in the bonus game which provides a bonus re-trigger in the bonus game. In one embodiment, only one bonus symbol 60 located on any payline 56 is required to obtain a bonus re-trigger in the bonus game. It should be appreciated, however, that any combination of the same bonus symbols, which is more likely to occur in the bonus game than in the primary game, may be used to obtain a bonus re-trigger in the bonus game in accordance with the present invention. Thus, the present invention provides a bonus game which increases the chances of obtaining a bonus re-trigger using the same primary symbols by requiring less of those symbols in the bonus game to obtain a bonus re-trigger than in the primary game, or by requiring a more likely to occur combination of those symbols in the bonus game to obtain a re-trigger in the bonus game. Returning now to FIG. 4, the appearance of bonus symbol "B" 60 in the bonus game causes a bonus re-trigger for the player in the bonus game. The bonus re-trigger is ten free spins in the bonus game as designated by the bonus display 66.

Figure 5A:
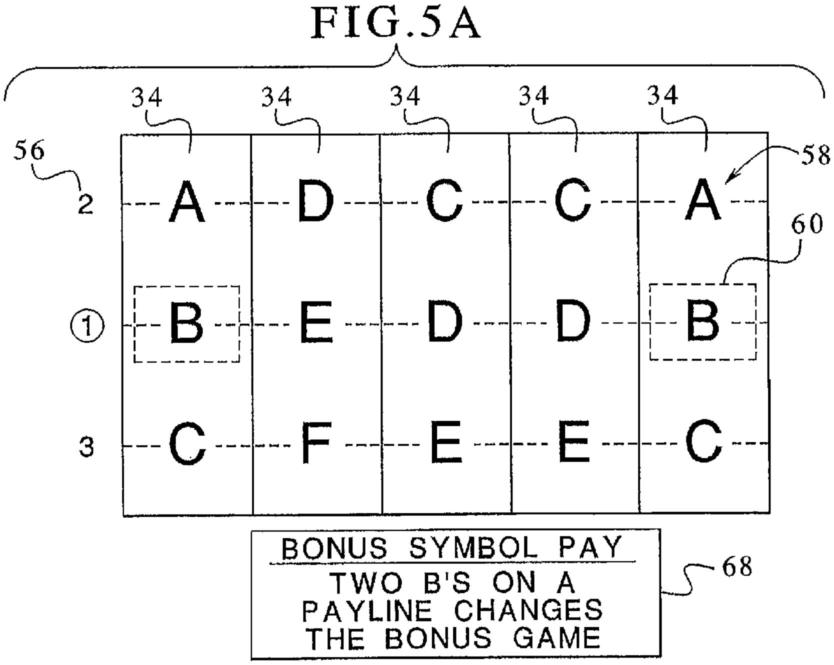
FIG. 5A is an enlarged front elevation view of one of the display devices of FIGS. 1A and 1B showing a bonus re-trigger where the bonus re-triggering combination is two "B" symbols on a payline.
Figure 5B:
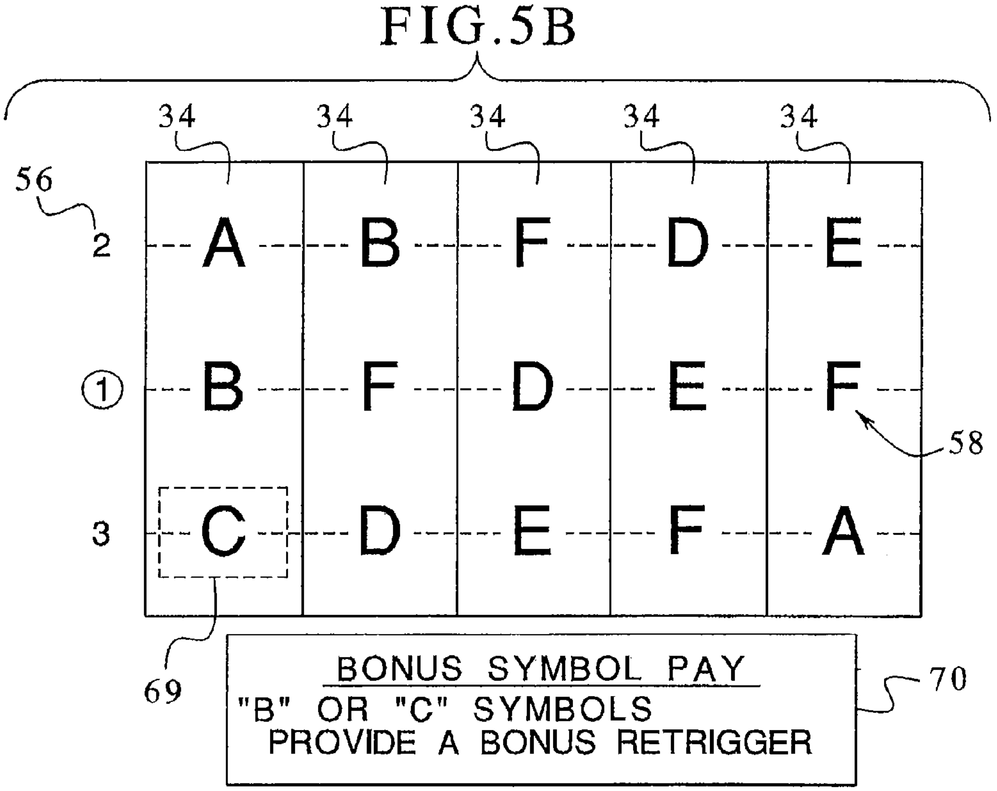
FIG. 5B is an enlarged front elevation view of one of the display devices of FIGS. 1A and 1B illustrating a bonus re-trigger where the bonus re-triggering symbol is a different symbol.

Another embodiment of the present invention is illustrated in FIGS. 5A and 5B. In this embodiment, the bonus re-trigger restructures or changes how the bonus game is subsequently re-triggered, initiated, or played, or changes the structure or type of the bonus game. Initially, the bonus game was triggered by obtaining three "B" symbols along a payline as shown in FIG. 3A, for instance. The bonus symbol "B" triggers the bonus re-trigger in the bonus game, which, in this case, changes the bonus game re-triggering symbol combination or event.

In FIGS. 5A and 5B, a player obtains two "B" symbols which changes the bonus re-triggering symbol or bonus mode. In one embodiment, the probability of obtaining the bonus re-triggering symbol becomes even greater. FIG. 5A illustrates one embodiment where the player obtains two "B" symbols 60 on one payline 56 in the bonus game which changes the bonus game as indicated by bonus display 68. This changes the bonus game to include another bonus re-triggering symbol "C."

In FIG. 5B, the bonus re-triggering symbol also now includes the "C" symbol 69 on any payline as described in bonus display 70. Since the bonus retrigger symbols now also includes the "C" symbol 69, the player has a better chance of obtaining the bonus re-trigger because both the "B" symbol and the "C" symbol now provide the bonus re-trigger in this new, modified, or changed bonus game. The bonus re-trigger could be, for instance, additional spins of the reels wherein a player can obtain bonus awards. The new bonus game could also change the paylines or other functions of the game, increase or decrease the number of reels in the base game, or change to an entirely new bonus game.

Figure 6:
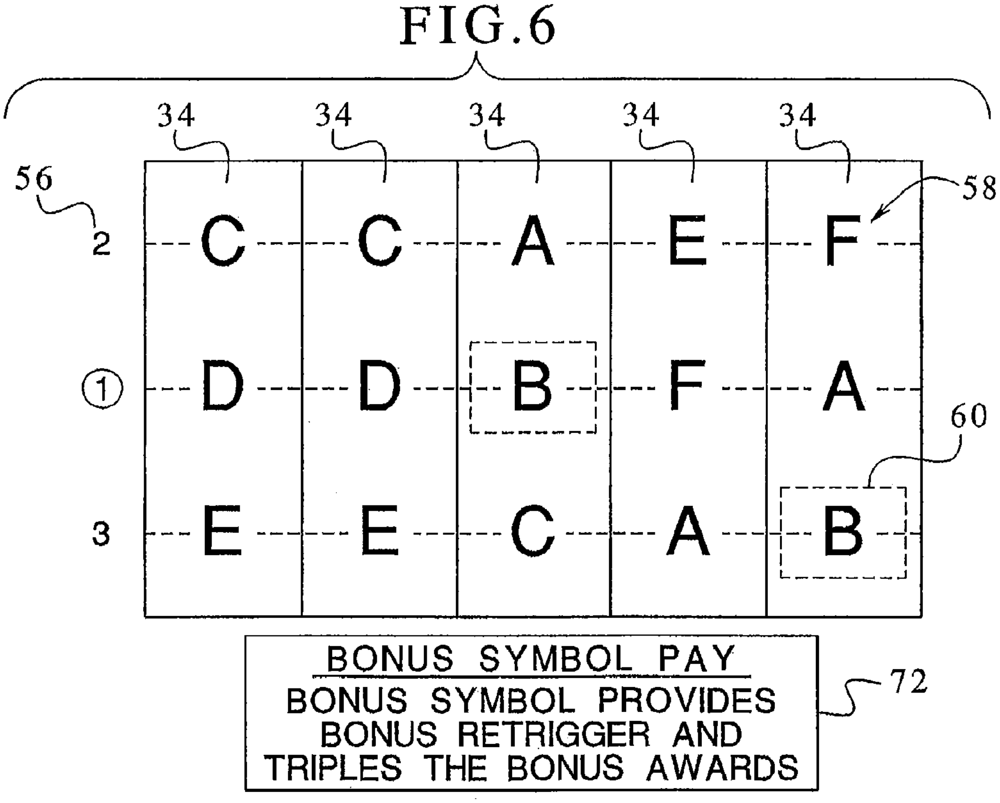
FIG. 6 is an enlarged front elevation view of one of the display devices of FIGS. 1A and 1B wherein the bonus re-trigger includes an award modification.

Referring now to FIG. 6, another embodiment of the present invention is shown where the bonus re-trigger additionally changes or modifies an award in the bonus game. In FIG. 6, the player entered the bonus game by obtaining a bonus triggering event that included three bonus symbols "B," designated by the numeral 60. The bonus symbol "B"

is the bonus re-triggering symbol in the bonus game. The player obtains the bonus re-triggering symbol "B" on paylines one and three. Thus, the player receives the bonus re-trigger and a modification of the award provided to the player in the bonus game as described by bonus display 72, which includes tripling the bonus award values. It should be appreciated that any modifications of the bonus award values may be made including, but not limited to, multiplying the values by some factor or increasing the bonus award values by a fixed amount.

Accordingly, the present invention provides a gaming device which includes a secondary game triggering event in a primary game which triggers a secondary game, a secondary game re-triggering event in the secondary game which re-triggers the entire secondary game or a portion thereof, wherein the secondary game re-triggering event in the secondary game is more likely to occur in the secondary game than the secondary game triggering event in the primary game. Preferably, the secondary game re-triggering event in the secondary game and the secondary game triggering event in the primary game employ the same triggering symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of operating a gaming system, the method comprising:
- establishing, by at least one processor, a credit balance based at least in part on a monetary value associated with a physical item following receipt of the physical item by an acceptor, the physical item being one of: a ticket and currency;
- placing, by the at least one processor, a wager on a play of a primary game responsive to an actuation of a wager button, the credit balance decreasable by the wager;
- randomly determining, by the at least one processor, and displaying, by at least one display device, a primary game outcome for the play of the primary game;
- determining, by the at least one processor, any primary game awards associated with the play of the primary game;
- displaying, by the at least one display device, any determined primary game awards, the credit balance increasable by any determined primary game awards;
- upon an occurrence of a secondary game triggering event in association with the primary game:
  - displaying, by the at least one display device, a secondary game;
  - re-triggering, by the at least one processor, the entire secondary game responsive to a secondary game re-triggering event occurring in association with the secondary game, wherein a probability of the secondary game re-triggering event occurring in association with the secondary game is greater than a probability of the secondary game triggering event occurring in association with the primary game; and
  - determining, by the at least one processor, and displaying, by the at least one display device, any secondary game awards associated with the secondary game, the credit balance increasable by any determined secondary game awards; and
- initiating, by the at least one processor, a payout associated with the credit balance responsive to an actuation of a cashout button.

2. The method of claim 1, wherein:
- the secondary game triggering event occurs when a first set of one or more triggering symbols is displayed for the play of the primary game; and
- the secondary game re-triggering event occurs when a second set of one or more triggering symbols is displayed for the secondary game.

3. The method of claim 2, wherein the first set and the second set include at least one same triggering symbol.

4. The method of claim 2, wherein the first set and the second set include at least two same triggering symbols, the secondary game triggering event occurs when any of a first quantity of triggering symbol combinations is displayed for the play of the primary game, and the secondary game re-triggering event occurs when any of a second quantity of triggering symbol combinations is displayed for the secondary game, the first quantity being at least one and the second quantity being greater than the first quantity.

5. The method of claim 1, wherein the first set and the second set include at least two same triggering symbols, the secondary game triggering event occurs when a first triggering symbol combination including a first quantity of triggering symbols is displayed for the play of the primary game, and the secondary game re-triggering event occurs when a second triggering symbol combination including a second quantity of triggering symbols is displayed for the secondary game, the first quantity being greater than the second quantity.

6. A method of operating a gaming system, the method comprising:
- establishing, by at least one processor, a credit balance based at least in part on a monetary value associated with a physical item following receipt of the physical item by an acceptor, the physical item being one of: a ticket and currency;
- placing, by the at least one processor, a wager on a play of a primary game responsive to an actuation of a wager button, the credit balance decreasable by the wager;
- randomly determining, by the at least one processor, and displaying, by at least one display device, a primary game outcome for the play of the primary game, the primary game being associated with a plurality of secondary game triggering symbols;
- determining, by the at least one processor, any primary game awards associated with the play of the primary game;
- displaying, by the at least one display device, any determined primary game awards, the credit balance increasable by any determined primary game awards;
- if a predetermined combination of a first quantity of the secondary game triggering symbols is displayed in association with the play of the primary game, the first quantity being at least two:
  - displaying, by the at least one display device, a secondary game;
  - re-triggering, by the at least one processor, the entire secondary game if a second quantity of the secondary game triggering symbols are displayed in association with the secondary game, the second quantity being at least one and being less than the first quantity; and determining, by the at least one processor, and displaying, by the at least one display device, any secondary game awards associated with the secondary game, the credit balance increasable by any determined secondary game awards; and initiating, by the at least one processor, a payout associated with the credit balance responsive to an actuation of a cashout button.

7. The method of claim 6, wherein the predetermined combination is associated with a wagered-on payline.

8. The method of claim 6, wherein the predetermined combination includes a scatter-pay combination.

9. A method of operating a gaming system, the method comprising:

establishing, by at least one processor, a credit balance based at least in part on a monetary value associated with a physical item following receipt of the physical item by an acceptor, the physical item being one of: a ticket and currency;

placing, by the at least one processor, a wager on a play of a primary game responsive to an actuation of a wager button, the credit balance decreasable by the wager;

randomly determining, by the at least one processor, and displaying, by at least one display device, a primary game outcome for the play of the primary game, the primary game being associated with a plurality of primary game symbols including a plurality of secondary game triggering symbols;

determining, by the at least one processor, any primary game awards associated with the play of the primary game;

displaying, by the at least one display device, any determined primary game awards, the credit balance increasable by any determined primary game awards;

if a first designated combination of the secondary game triggering symbols is displayed in association with the play of the primary game, for each of a designated quantity of plays of a secondary game, wherein the secondary game is associated with a plurality of secondary game symbols including the plurality of secondary game triggering symbols:

displaying, by the at least one display device, that play of the secondary game;

if a second designated combination of the secondary game triggering symbols is displayed in association with the play of the secondary game, providing the player at least one additional play of the secondary game, wherein a probability of the second designated combination of the secondary game triggering symbols occurring in association with that play of the secondary game is greater than a probability of the first designated combination of the secondary game triggering symbols occurring in association with the primary game; and determining, by the at least one processor, and displaying, by the at least one display device, any secondary game awards associated with that play of the secondary game, the credit balance increasable by any determined secondary game awards; and initiating, by the at least one processor, a payout associated with the credit balance responsive to an actuation of a cashout button.

10. The method of claim 9, wherein the plurality of primary game symbols and the plurality of secondary game symbols are different.

11. The method of claim 9, wherein the plurality of primary game symbols includes at least one symbol not included in the plurality of secondary game symbols.

12. The method of claim 9, wherein the first designated combination of the secondary game symbols and the second designated combination of the secondary game symbols are the same.

13. The method of claim 9, wherein the first designated combination of the secondary game symbols and the second designated combination of the secondary game symbols are different.

14. The method of claim 13, wherein the first designated combination of the secondary game triggering symbols includes a first quantity of secondary game triggering symbols and the second designated combination of the secondary game triggering symbols includes a second quantity of secondary game triggering symbols, the first quantity being greater than the second quantity and the second quantity being at least one.

15. A method of operating a gaming system, the method comprising:

establishing, by at least one processor, a credit balance based at least in part on a monetary value associated with a physical item following receipt of the physical item by an acceptor, the physical item being one of: a ticket and currency;

placing, by the at least one processor, a wager on a play of a primary game responsive to an actuation of a wager button, the credit balance decreasable by the wager;

randomly determining, by the at least one processor, and displaying, by at least one display device, a primary game outcome for the play of the primary game, the primary game being associated with a plurality of primary game reels and a plurality of primary game symbols including a plurality of first designated symbols;

if a designated combination of the first designated symbols is displayed in association with the play of the primary game, displaying, by the at least one display device, a designated number of activations of a plurality of secondary game reels, wherein the secondary game reels are associated with a plurality of secondary game symbols including a plurality of second designated symbols that can form a plurality of designated combinations of the second designated symbols, each of the designated combinations of the second designated symbols being associated with an additional designated number of activations of the secondary game reels;

for each displayed activation of the secondary game reels, for each one of the designated combinations of the second designated symbols displayed in association with that activation of the secondary game reels, displaying, by the at least one display device, the additional designated number of activations of the secondary game reels associated with that designated combination of the second designated symbols, wherein at least one of the designated combinations of the second designated symbols is associated with a probability of occurrence in that activation of the secondary game reels that is greater than a probability of occurrence of that designated combination of the first designated symbols in the primary game; and initiating, by the at least one processor, a payout associated with the credit balance responsive to an actuation of a cashout button.

16. The method of claim 15, wherein the primary game reels and the secondary game reels are the same.

17. The method of claim 15, wherein the primary game reels and the secondary game reels are different.

18. The method of claim 15, wherein the designated combination of the first designated symbols and at least one of the designated combinations of the second designated symbols include the same quantity of symbols.

19. The method of claim 15, wherein the designated combination of the first designated symbols and at least one of the designated combinations of the second designated symbols include different quantities of symbols.

20. The method of claim 15, wherein at least two of the designated combinations of the second designated symbols include different quantities of symbols.

* * * * *